United States Patent [19]

Wahl

[11] Patent Number: 4,731,860

[45] Date of Patent: Mar. 15, 1988

[54] METHOD FOR IDENTIFYING THREE-DIMENSIONAL OBJECTS USING TWO-DIMENSIONAL IMAGES

[75] Inventor: Friedrich M. Wahl, Langnau a. Albis, Switzerland

[73] Assignee: International Business Machines Corporation, Armonk, N.Y.

[21] Appl. No.: 874,313

[22] Filed: Jun. 13, 1986

[30] Foreign Application Priority Data

Jun. 19, 1985 [EP] European Pat Off. ............ 85107445

[51] Int. Cl.$^4$ ............................................. G06K 9/72
[52] U.S. Cl. ..................................... 382/41; 364/725; 382/23
[58] Field of Search ......................... 382/41, 43, 8, 23; 364/725, 826

[56] References Cited

U.S. PATENT DOCUMENTS 3,069,654 12/1962 Hough .................................. 382/41
4,618,989 10/1986 Tsukune et al. ...................... 382/41

OTHER PUBLICATIONS

Perkins et al., "A Corner Finder for Visual Feedback", *Computer Graphics and Image Processing*, 1973, pp. 355-376.

Primary Examiner—Leo H. Boudreau
Assistant Examiner—Joseph Mancuso
Attorney, Agent, or Firm—Thomas P. Dowd

[57] ABSTRACT

For recognizing a three-dimensional object from its two-dimensional image which was produced e.g. by a TV camera, a Hough transform representation is generated of the image and specific configurations or structures of the cluster points which constitute the Hough transform representation are determined. The information about these specific configurations is compared to similar information stored for the Hough representation of known object models. By thus relating portions of the image to portions of one or several object models, vertices of the image which are present at line or edge intersections, are related to vertices of the known object model(s). This knowledge about the correspondence of model and object vertex points allows the exact fitting of vertices and thus recognition of the unknown object and its relative orientation. The models may be either primitive objects and the procedure determines of which primitives the unknown object is composed, or the models may be wire frame models each of which completely describes one more complicated object and the procedure determines to which of the models the entire unknown object fits best.

18 Claims, 16 Drawing Figures

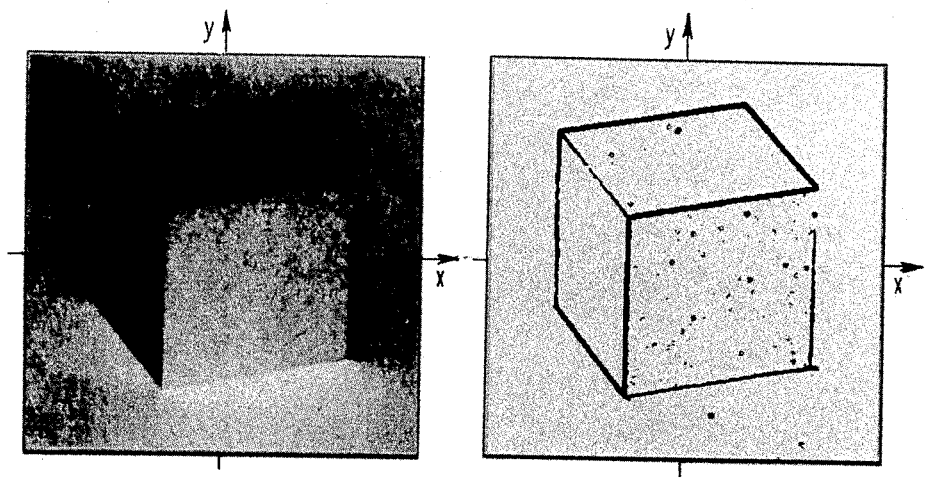
Original Image
FIG. 3a
Binary Gradient Image
FIG. 3b
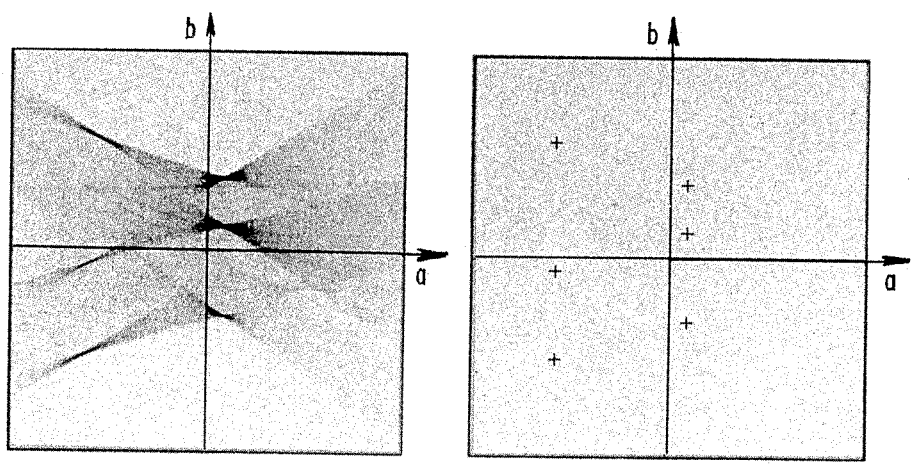
Hough Space
FIG. 3c
Clusters of Edges
FIG. 3d Binary Gradient Twin Hough Space Clusters of Edges Corresponding Edges in Image Space Graph Representing Wire Frame Model Subgraph Representing Unknown Object (Visible Portions)

METHOD FOR IDENTIFYING THREE-DIMENSIONAL OBJECTS USING TWO-DIMENSIONAL IMAGES

FIELD OF INVENTION

Present invention is related to a method for recognizing or identifiying three-dimensional objects. More particularly, it is concerned with a recognition or identification method for a three-dimensional object, which uses a two-dimensional image of the object and a Hough transform of the available image. The invention finds application e.g. in robotics systems or automatic part handling machines in which the objects or parts are seen e.g. by a TV camera, and in which on the basis of the two-dimensional TV image the kind and the orientation of the viewed object must be determined.

BACKGROUND

In many industrial applications versatile vision systems play an essential role. In the area of quality control, the completeness of assemblies has to be tested; in automated manufacturing, machine parts have to be recognized and their position or orientation has to be determined in order to support flexible manipulator control, etc. Usually, only a two-dimensional picture such as a television camera output is available of the scene which comprises the assembly or the machine part to be handled.

An article by L. G. Roberts "Machine perception of three-dimensional solids", published in "Optical and Electrooptical Information Processing" (Eds: J. T. Tippett et al.), MIT Press, Cambridge, Mass., 1968, pp. 159–197, disclosed procedures for the recognition of three-dimensional objects on the basis of two-dimensional photographs. Polygons which are required for the identification have to be found in the picture. A difficulty is that in many pictures, the lines which represent the object and which form polygons are not complete due to noise or spots which cause local interruptions, so that finding the polygons will not be possible.

In U.S. Pat. No. 3,069,654 (Hough), a method and means are disclosed for recognizing complex patterns. It describes the basic procedure for generating a Hough transform of lines in an image which transform is then used for determining location and orientation of the lines in the image; these lines may be traces in a bubble chamber or a handwritten signature. No recognition of objects is considered.

Some suggestions were made for using Hough transforms to recognize objects or mechanical parts. However, these methods require either higher-dimensional Hough transforms (more than 2-D) or some additional knowledge about spatial parameters of the objects (e.g. surface normals or depth information obtained by structured light or range procedures). They require much computational effort.

OBJECT OF THE INVENTION

It is an object of the invention to devise a method for recognizing or identifying a three-dimensional object on the basis of a two-dimensional image of the object. A more particular object of the invention is such a recognition method which uses a Hough transform of the available two-dimensional image of the object.

DESCRIPTION OF THE INVENTION

For recognizing an object from the Hough transform of a two-dimensional object image, the invention determines, in the Hough transform domain (Hough space representation), whether particular structures or configurations of clusters are available. Such clusters are known to be the center points of intersecting lines constituting the Hough space representation. The configurations found are compared to other cluster configurations which are available for known models, and the result of such comparison is the selection of one or a few candidate models, and a relation between vertices (corner points) of such model and vertices of the object image. Using Hough transform techniques, an exact matching between vertices can then be made to select one of several candidate models, if necessary, and to determine the location or orientation of the object with respect to the basic orientation of the model.

The models may be either object primitives such as parallelepiped, tetrahedron etc. and one or several of such object primitives are found to be constituting the unknown object, or the models may be wire frame models each of which is a complete description of one object in 3-D representation so that only a finite set of different objects can be recognized.

For the models, a characterization of the specific cluster configurations which occur in their 2-D Hough-space representation is prepared and stored and is thus available for comparison. The basic structure used for recognition is the colinearity or straight line arrangement of more than two clusters, and specific configurations are e.g. vertical colinearities, colinearities intersecting exactly in a cluster, arrangements of several such intersecting colinearities, etc.

The invention enables efficient recognition of objects and a determination of their location or orientation by merely using a Hough transform of a 2-D image, and by extracting information on cluster arrangements of specific structure and comparing them to stored data on cluster arrangements of known models. Even if the available image is not perfect because it contains noise or line interruptions, or partially occluded edges the recognition method is reliable.

Embodiment of the invention is described in the following with reference to drawings.

LIST OF DRAWINGS

FIG. 1 schematically illustrates the basic technique for using a 2-D image and a 3-D model for recognition;

FIG. 2 is an illustration of the Hough transform;

FIGS. 3a–d shows the development from a grey-scale image of an object to a Hough space cluster representation of the object;

FIGS. 4a–d shows the development from an image to a cluster representation using a twin Hough space;

DETAILED DESCRIPTION

Machine Vision Principle

Figure 1:
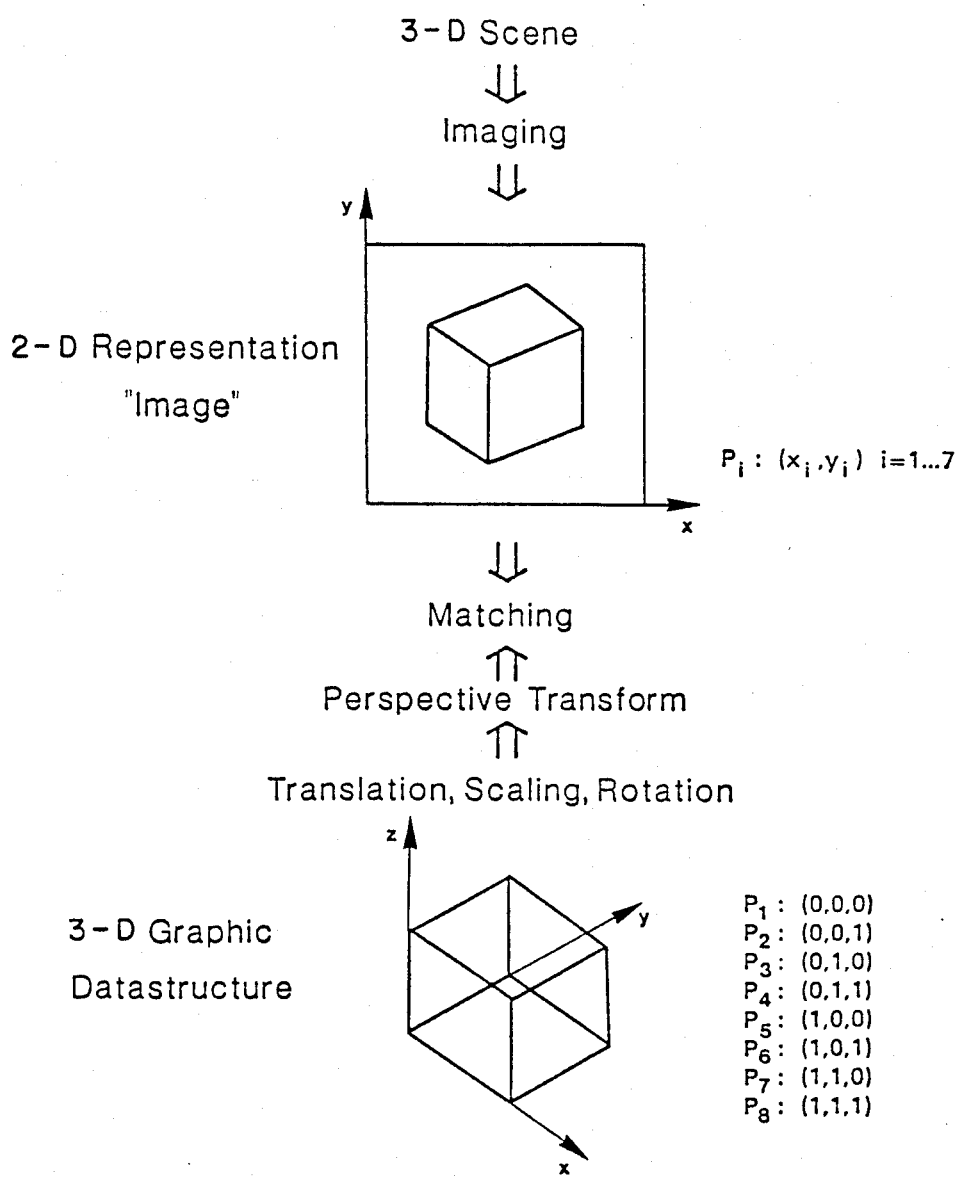

FIG. 1 illustrates the principle of machine vision in which the present invention finds application. A 3-D physical scene containing a cube might be mapped by means of a sensor, e.g., a TV camera, into a 2-D digital image. The captured image can now be processed by a computer to extract image features such as object edges, vertices, etc. (cf. upper part of FIG. 1). On the other hand abstract object models can be represented in the computer in form of, e.g., CAD data structures. A cube, e.g., can be modeled as unit cube in 3-D coordinate space by coordinate triples of its vertices and their associated spatial relatons with each other. Applying 3-D coordinate transforms such as translation, rotation and scaling, a computer image can be generated by a subsequent perspective transform (cf. lower part of FIG. 1). This 2-D representation can be used to fit the object 'cube' with the image captured from the real scene. With this in mind one can state the principle of identifying objects as follows: Given a real image and given some object models, find the model which under some coordinate transforms, with parameters to be determined, best fits the real image. For polyhedral objects, e.g., it is advantageous with respect to the computational expense to use extracted vertice points from the real image and to relate them to the model vertices. Present invention utilizes the power of robust feature detection (straight lines) by means of the Hough transform and a subsequent analysis of the Hough space representation to extract object vertice points for object recognition.

Principles of Hough Transform Representation

Figure 2:
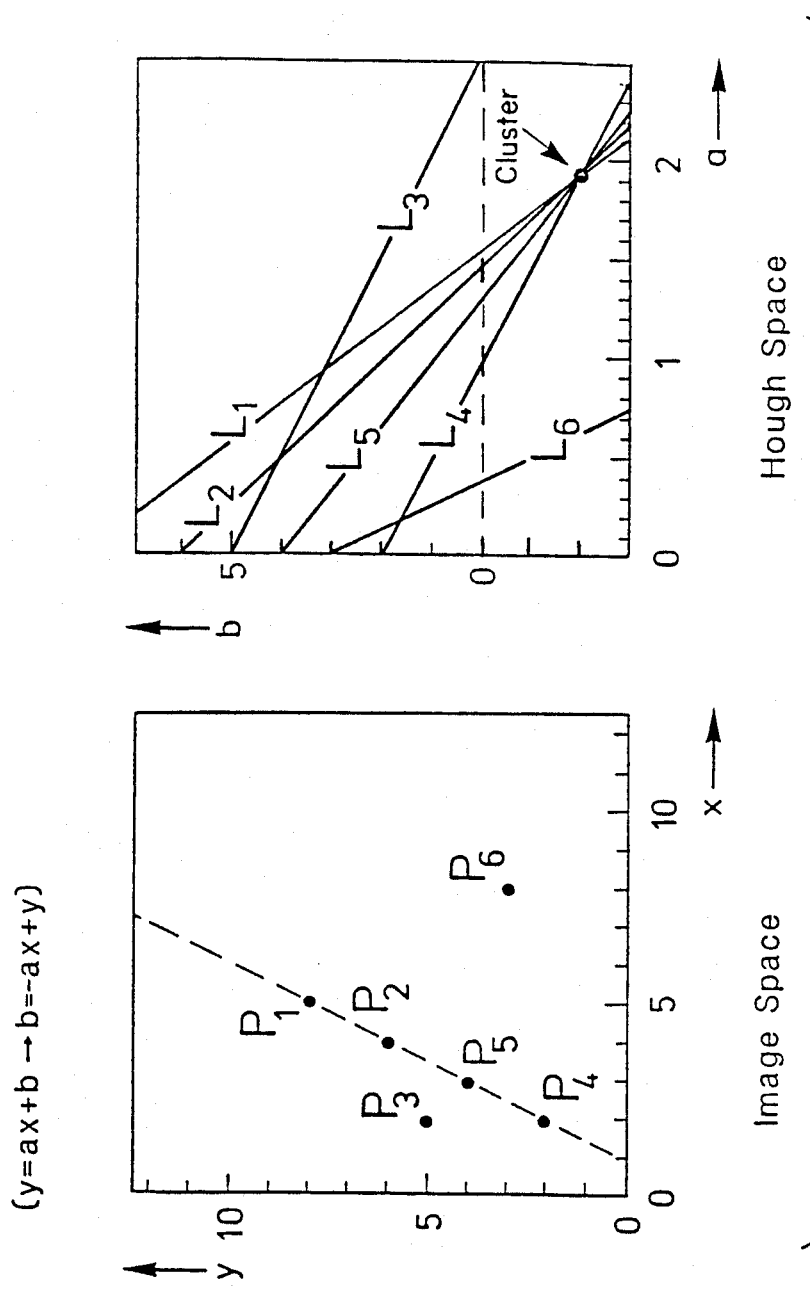

The Hough transform is a noise-insensitive method of detecting colinear image points, e.g. straight lines, in images. Reference is made to FIG. 2 to explain its principle. A line can be characterized by the equation $$y = ax + b$$

with the two parameters a, b. Resolving this equation with respect to b yields $$b = -ax + y.$$

As can be seen, an image point with coordinate values x, y is mapped into a line in a,b-space, denoted as Hough space. The Hough transform accumulates lines with intercept and slope determined by the x,y-coordinate values of its corresponding image points. The very useful property is, as can be seen from FIG. 2, that colinear image points ($P_1$, $P_2$, $P_4$, $P_5$) correspond to lines in Hough space, intersecting at exactly one distinct location called cluster. Thus, straight lines easily can be detected by extracting clusters in Hough space. The position and orientation of the line is fully determined by its corresponding cluster location in Hough space. Several different straight lines result in several clusters in Hough space at corresponding locations.

Figure 4A:
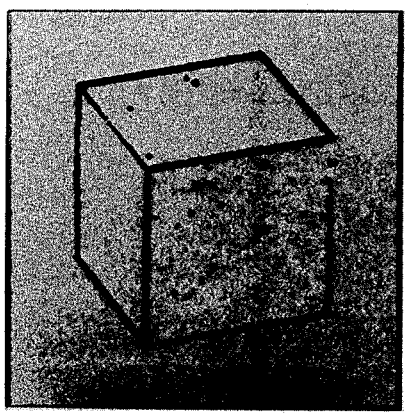
Figure 4B:
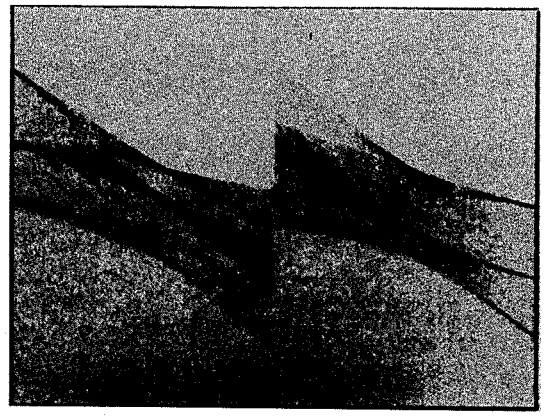
Figure 4C:
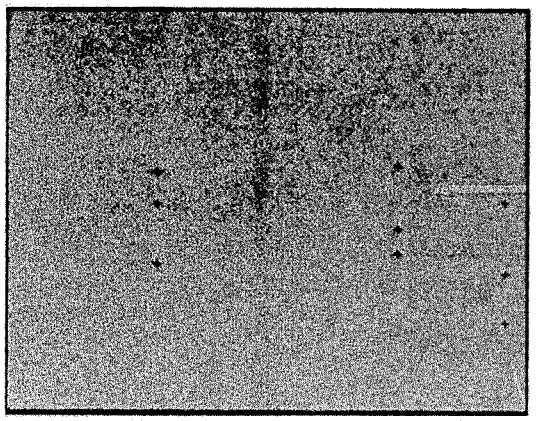
Figure 4D:
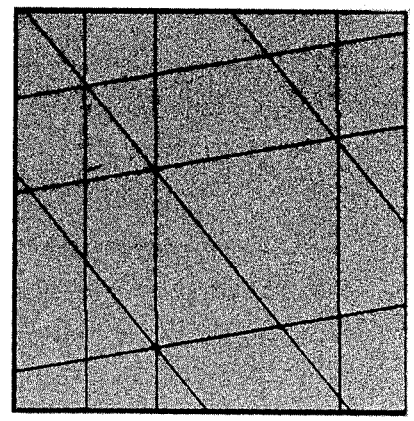

FIG. 3 shows a processing example with the Hough transform. A simple edge detector and a subsequent thresholding operation has been applied to a digital image containing a cube (FIG. 3a). The resulting binary gradient image (FIG. 3b) is the input to the Hough transform. The result of the Hough transform is shown in FIG. 3c. Although the input of the Hough transform is noisy and some lines include gaps, clearly six distinct clusters can be recognized which easily can be detected (the result is shown in FIG. 3d). As a cube in general has nine edges one might expect rather nine than six clusters. Obviously the clusters of vertical edges (edges with infinite slope) are mapped to infinity in Hough space. This can easily be avoided by applying the Hough transform twice to the image (cf. FIG. 4). In a first pass it is applied directly to the binary gradient image FIG. 4a) and subsequently in a second pass its by 90 deg rotated version is transformed. (Note that both passes can be calculated simultaneously by appropriate Hough space array indexing.) The resulting twin Hough space shown in FIG. 4b contains the complete set of clusters corresponding to the cube's edges. The transform of the extracted clusters (cf. FIG. 4c) back into image space (the backward Hough transform is identical with forward Hough transform) results in a Hough space representation of the original image which is shown in FIG. 4d. It can be seen that the Hough space representation on its own does not deliver object vertices which are required for vertice matching, i.e. object recognition. How vertex matching for object recognition can be achieved by the invention with the Hough transform is explained in the following.

New Method for 3-D Object Recognition

It has been found out that in the Hough space representation of polyhedra images, the clusters form specific structures or configurations which are representative of the respective polyhedra, or at least of some portions or features of them. The following is a listing of such structures or configurations:

(1) Clusters corresponding to lines (or edges) with the same intercept are aligned horizontally in Hough space.

(2) Clusters corresponding to lines with the same slope (parallel lines) are aligned vertically in Hough space.

(3) The number of visible non-colinear straight edges of an object is equal to the number of clusters corresponding to this object.

(4) n lines intersecting each other at one distinct point in image space (vertices) correspond to a colinear arrangement of n clusters in Hough space (n-cluster-colinearity).

It should be noted that vertical alignments of clusters in Hough space are also cluster colinearities and thus may be considered as parallel lines which intersect each other at infinity.

(5) Two or more cluster colinearities intersecting each other at one distinct cluster location correspond to vertices which are colinear.

Figure 5:
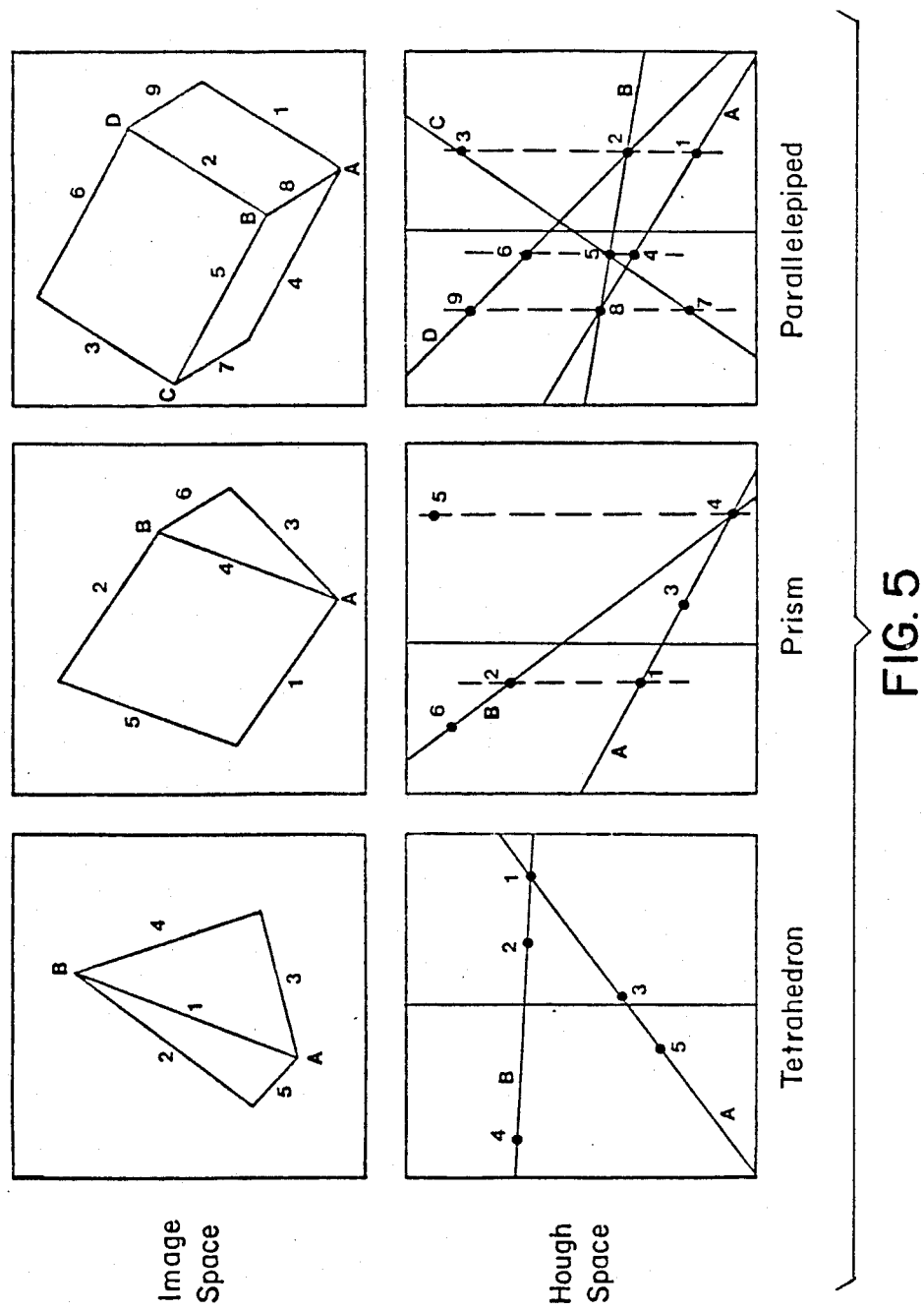
FIG. 5 shows, for three object primitives, the two-dimensional line image representation and the particular cluster configurations which appear in the Hough space representation of these object primitives.

These properties can be employed to characterize simple object primitives which are useful for decomposition and representation of more complex polyhedral objects. FIG. 5 shows some examples.

Tetrahedron:

Usually two (from special view angles one or three) faces of a tetrahedron are visible. As there are no parallel edges, no vertical alignments of cluster points occur in Hough space. There are two vertices (A, B) with three intersecting edges (A: 1, 3, 5 and B: 1, 2, 4); these share one common edge (1). Thus, in Hough space tetrahedra are represented by two 3-cluster-colinearities sharing exactly one cluster.

Prism:

Usually two (from special view angles one or three) faces of a prism are visible. As FIG. 5 shows, there are two pairs of parallel edges which appear as two pairs of vertically aligned cluster points in Hough space (dashed lines). As there are two vertices (A, B) where three edges intersect (A: 1, 3, 4 and B: 2, 4, 6) with edge (4) common to (A) and (B), we expect two 3-cluster-colinearities in Hough space intersecting each other exactly at one cluster location and an additional isolated cluster (5).

Parallelepiped:

Usually three faces (from special views one or two) faces of a parallelepiped are visible. As there are three triples of parallel edges (1, 2, 3; 4, 5, 6; 7, 8, 9) we expect three vertical cluster alignments with three clusters each (dashed lines). There are four vertices where three edges intersect (A: 1, 4, 8; B: 2, 5, 8; C: 3, 5, 7; D: 2, 6, 9) which correspond to four 3-cluster-colinearities in Hough space. As the central vertice point B shares its edges with A, C, D, the corresponding 3-cluster-colinearities of A, C, D, intersect the 3-cluster-colinearity of B exactly at three different cluster locations. The resulting structure may be considered as a z-shape with an additional diagonal crossing it (z-structure).

The examples demonstrate, how distinct vertex points of polyhedral objects can be identified in Hough space and thus can be related to model vertices. Using this information on the relation between vertex points in the object image and in a model, object matching is possible by means of geometric vertex fitting as described e.g. in the above mentioned article by L. G. Roberts.

Complex polyhedral objects can be analysed and identified in two ways: (A) by successive decomposition of the Hough space into substructures corresponding to object primitives and (B) by comparison of the Hough space with the Hough space representation of wire frame models.

(A) Decomposition Into Object Primitives

Figure 6:
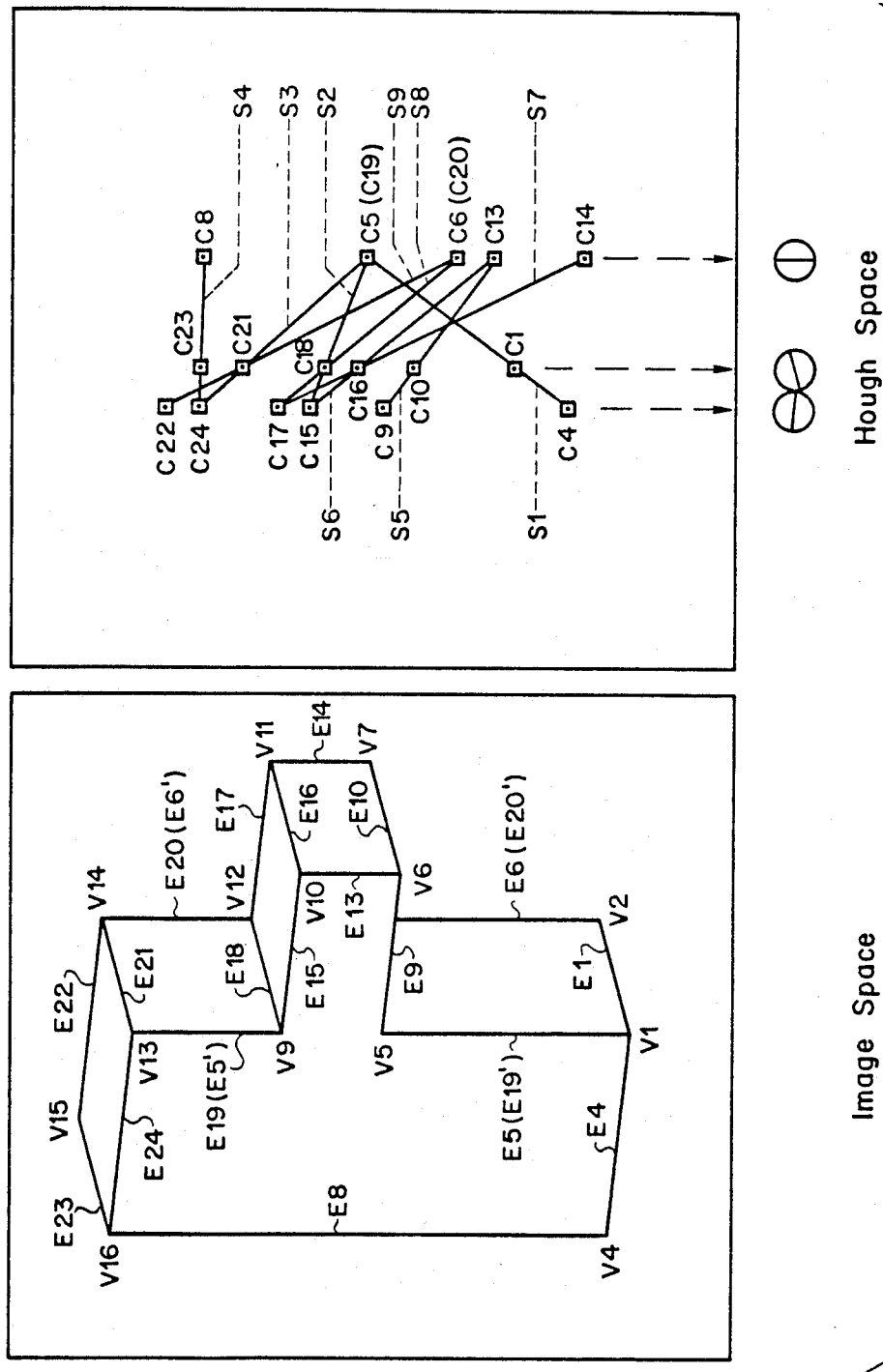
FIG. 6 shows, for a composed object, the line image representation and its Hough space cluster representation indicating all cluster colinearities.

In order to demonstrate the decomposition principle by an illustrative example which is simple enough to follow without computer the t-shaped object shown in FIG. 6 is chosen. The vertices are designated as Vi (V1 ... V16), and the edges are designated as Ei (E1 ... E24). However, only a portion of all edges and vertices of the t shape are visible in the image of FIG. 6. Under the shown view direction the polyhedron has nine visible vertices where three edges meet. These correspond to nine cluster colinearities in Hough space (which can be extracted by a Hough transform as well). It should be noted that in FIG. 6 colinear line segments in image space correspond to one cluster point in Hough space; thus the distinction between edges E5/E19 and E6/E20 are mere artefacts of the Hough simulator used to produce the Hough space representations throughout this description. Listing the colinearities of FIG. 6 yields Table 1. Each row represents one colinearity. The left column contains the running index of each colinearity, the next three columns contain the indices of all clusters constituting a colinearity and the rightmost column is a count indicating how many cluster points of the colinearity are shared with other colinearities.

Decomposition of the Hough space leads to the problem of recognizing a prior known substructures in Hough space which are Hough cluster representations of object primitives. Using the object primitive set shown in FIG. 5, the decomposition is started with the most complex object, i.e. in this case with the object primitive "parallelepiped". As the corresponding Hough cluster structure is a z-structure, one searches for a decomposition of the cluster pattern in Hough space shown in FIG. 6 such that some or possibly all clusters corresponding to the t-shaped object of the example are covered by one or more z-structures. In order to answer this question a so-called 'colinearity cluster coverage table' (Table 2) is calculated which results by a slight rearrangement of Table 1; the 1's indicate which clusters belong to which colinearity. As the z-structures consist of one 'central' colinearity sharing all three clusters with other colinearities one takes the four colinearities with a "3" in the rightmost column of Table 1 as potential candidates to be the central colinearities of such a z-structure. If then Table 2 is restricted to colinearities S2, S3, S6, and S8 each of which shares all its clusters with other colinearities and if the clusters covered by those other colinearities are marked by 0's, one obtains the 'reduced colinearity cluster coverage table' shown in Table 3. As can be seen, there are two alternatives for colinearities S2 and S3 to be the central colinearity of a z-structure; e.g. colinearity S2 might be considered to share cluster C5 with colinearity S1 or alternatively with colinearity S3. This results in two lines (a) and (b) for each of the two colinearities S2 and S3 in Table 3. The respective z-structures consist of following colinearities: S1-S2(a)-S6-S8/S3-S2(b)-S6-S8/S1-S3(a)-S4-S9/S2-S3(b)-S4-S9. As the two alternatives cannot coexist in any solution, Table 3 can be decomposed into a set of four tables (Table 4) each representing several z-structures that can coexist. Thus the decomposition of the Hough space pattern of FIG. 6 into z-structures leads to the four alternative 'reduced colinearity cluster coverage tables' as shown in Table 4. In case (A) a minimum of three z-structures is necessary to cover all clusters (central colinearities S2(a), S3(a), S6). In case (B) there is no combination of z-structures to cover all clusters in Hough space. In cases (C) and (D) two z-structures with colinearities S3(b) and S6 as central colinearities are sufficient to cover all clusters in Hough space. Thus a minimal decomposition of the t-shaped object into two parallelepipeds with edges E5, E21, E24 and E13, E15, E16 as inner edges of the parallelepiped results, and no further decomposition into other object primitives is necessary. The x,y-coordinates of the corresponding vertex points in image space are fully determined by the slope and intercept of the four colinearities of the corresponding z-structures in Hough space. In addition the x,y-coordinates of the remaining three vertex points of the parallelepiped where two edges intersect each other are implicitly given by the z-structures. Thus all vertex points of the primitives which constitute the object in image space can be related to the vertices of a unit cube in 3-D space and e.g. geometrical transform parameters can be calculated according to known approaches, such as described in the above-cited paper by L. G. Roberts.

Below the right portion of FIG. 6 there are shown three small circles each with an inclined line. All the clusters which are located on a vertical line above a circle represent edges in the image which run parallel (e.g. C4, C9, C15, C17, C22, C24 and E4, E9, E15, E17, E22, E24). The direction of the inclined line of the respective circle below the Hough space indicates the slope of the associated edges in the image space.

It should be noted that in general composite objects seen under arbitrary view angles do not expose the complete set of object primitive edges (in general several edges will be hidden). The technique described above for decomposing an object into object primitives can be summarized as follows:
(1) Capture image of scene and digitize it.
(2) Calculate gradient image and apply threshold to it.
(3) Transform binary gradient image into Hough space.
(4) Detect clusters in Hough space.
(5) Extract properties (configurations) of clusters in Hough space.
(6) Relate vertices of object primitives to vertices of object models (using known cluster properties).
(7) Find the model which best fits the vertices extracted from scene.

(B) Comparison With Wire Frame Hough Space Models

Figure 7:
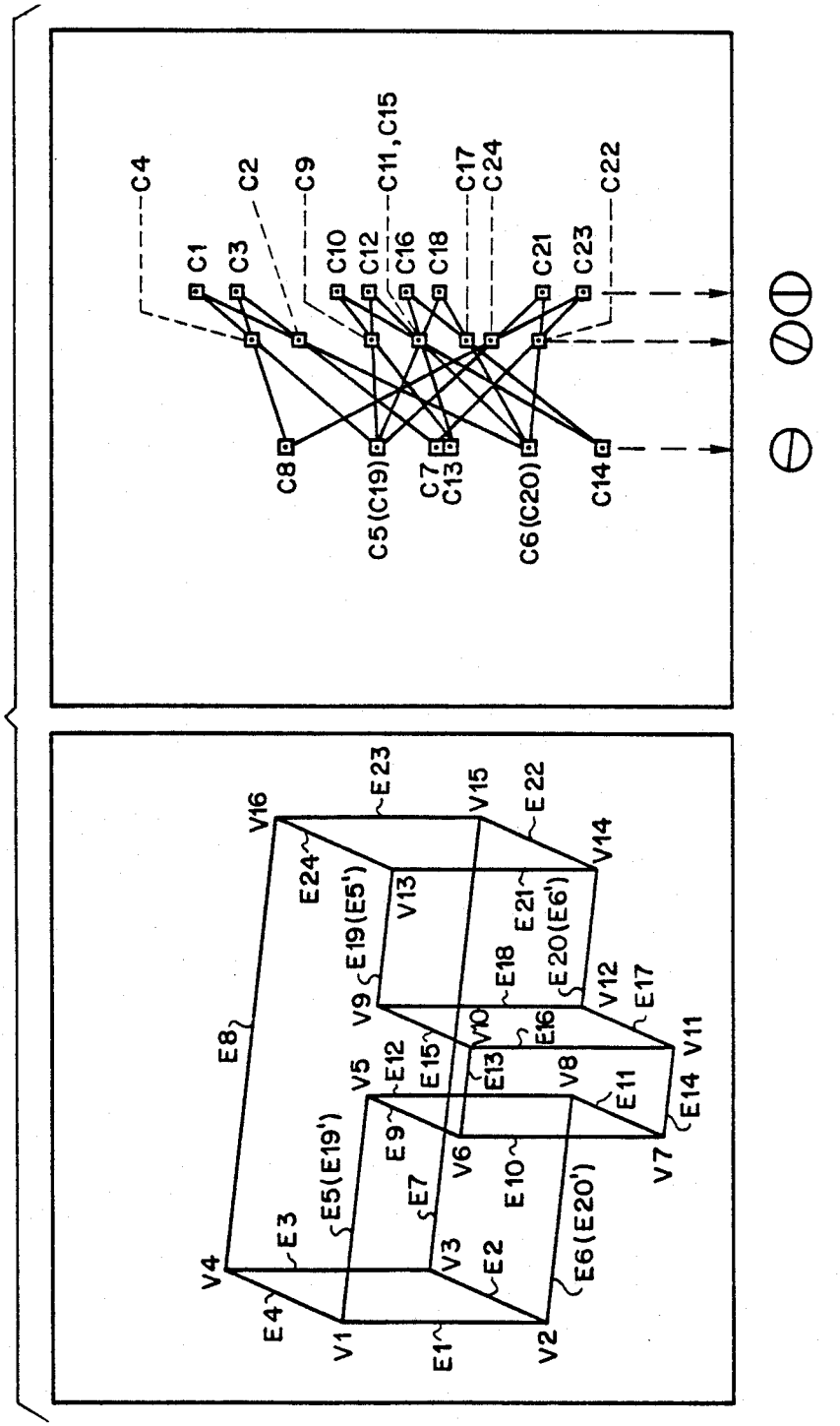
FIG. 7 shows, for the composed object of FIG. 6, a complete wire frame model including all edges and vertices, and the respective Hough space cluster representation indicating all cluster colinearities.

As opposed to the former approach full a prior knowledge about the objects to be recognised is employed in this case. The objects are represented by wire frame models, generated e.g. by a CAD design system. Mapping a 3-D object wire frame representation into a 2-D image plane by means of a perspective transform with the focal distance point at infinity and transforming the resulting image into Hough space yields a representation which can be called the wire frame Hough space model. For the t-shaped object an example for such a representation is shown in FIG. 7. The edges (E1 ... E24) and the vertices (V1 ... V16) carry, for the ease of understanding, the same designations as in FIG. 6, except that in the wire frame model image there are no hidden or invisible lines or vertices. Hough space wire frame representations implicitly comprise information about edge/vertex neighborhoods as well as about parallel edges. For further processing this information can be made explicit by precalculating the cluster colinearities; edges of common slope can be listed by looking for vertically aligned clusters in Hough space. (Note that these quantities could also have been derived from 3-D wire frame models directly.) Tables 5 and 6 show the colinearity table and an edge slope list, respectively, for the wire frame representation in FIG. 7.

Figure 8:
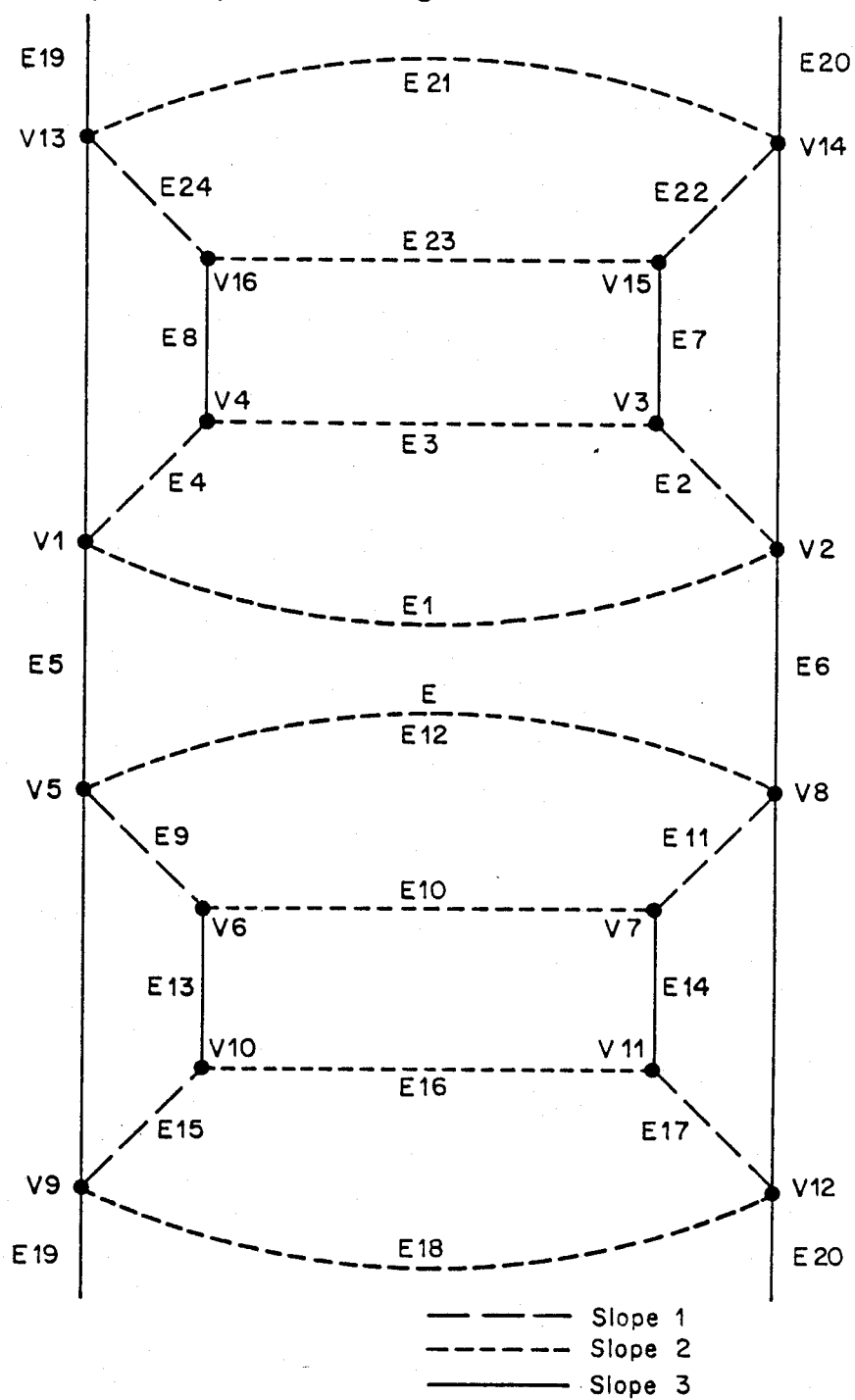
FIG. 8 is a boundary graph representation of the interconnections of all edges and vertices of the wire frame model of FIG. 7, indicating common slopes of edges.

The important point of the wire frame Hough space comparison is, that the edge images of physical objects which are transformed into Hough space exhibit cluster structures which are to be considered as subgraphs of graphs implicitly given by the wire frame Hough models. In order to demonstrate this, the colinearity table (Table 5) and edge slope list (Table 6) of FIG. 7 have been sketched in FIG. 8 (also known as labeled boundary representation). The edges in FIG. 8 are labeled according to the edges in FIG. 7. Assuming an edge image of a physical object like the image in FIG. 6 and transforming it into Hough space, the corresponding colinearity table would be equivalent to Table 1. The corresponding slope list is given in Table 7. Tables 1 and 7 immediately yield the boundary representation shown in FIG. 9. It has now to be checked whether this graph (whose edges are marked to indicate the image edge slope) matches some part of the graph derived from the wire frame Hough space models; this matching is done by schematic comparison of the contents of respective colinearity and edge slope tables in a computer. It easily can be verified that there are 32 different possibilities for matching the graph in FIG. 8 with the subgraph in FIG. 9.

Figure 9:
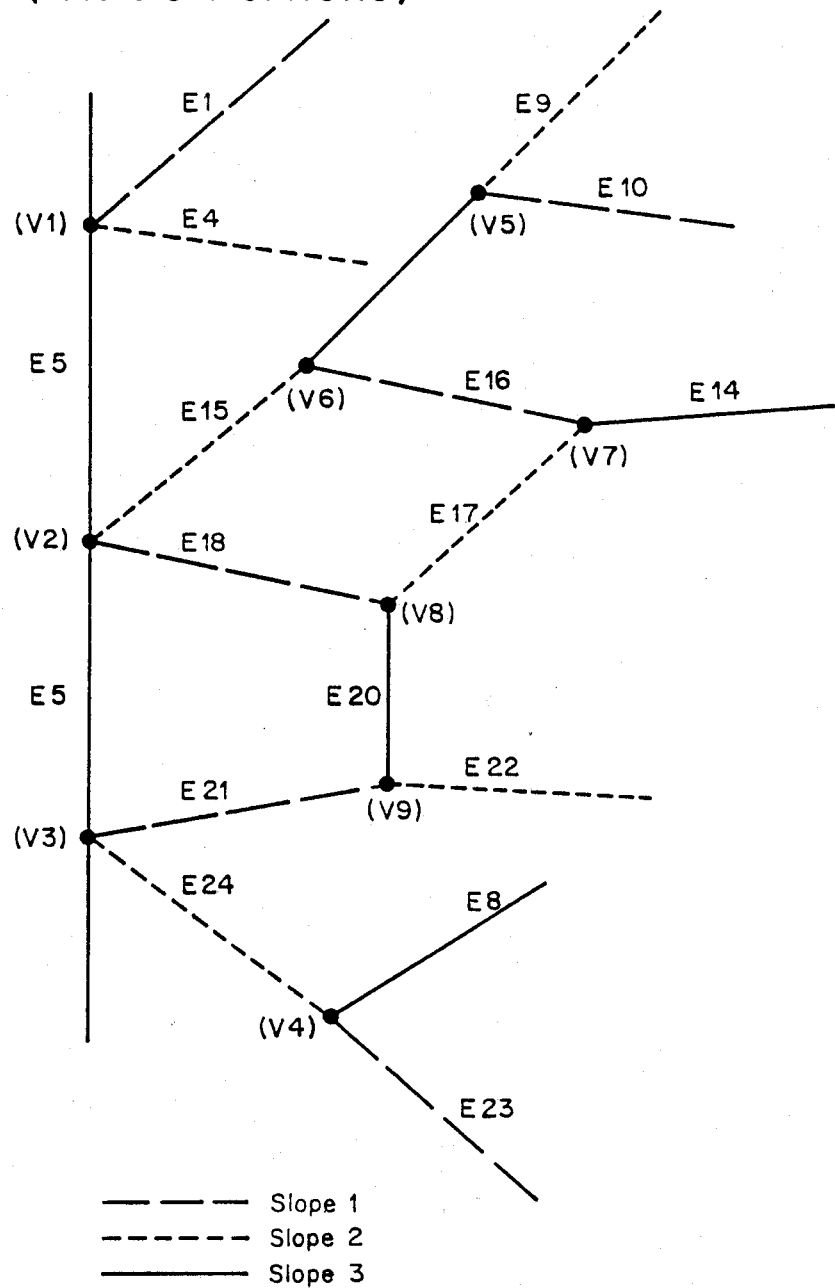
FIG. 9 is a boundary graph representation of the interconnections of edges and vertices of the object of FIG. 6, as they can be derived from the Hough space cluster representation of the object, which graph is a subgraph of the graph shown in FIG. 8.

Such procedures for matching a subgraph (which is the graph of FIG. 9, representing the object) to a complete graph (which is the graph of FIG. 8, representing the wire frame model) are well known, and are described e.g. in an article by J. R. Ullmann "An agorithm for subgraph isomorphism", Journal ACM, Vol. 23, No. 1, January 1976, pp. 31–42 and in the references cited in this article.

If the subgraph matching results in several possible solutions (of which only one should be correct), a final selection is made by exact vertex point fitting on the basis of given geometric relations between the known vertex points (distance etc.).

Although in terms of the computational expense the matching is not too burdensome it might be desirable to further cut down this search. This can be achieved by additional heuristic and object dependent rules. E.g., the upper half of the graph in FIG. 8 corresponds to the peripheral vertices V1, V2, V3, V4, V13, V14, V15, V16 and the lower half stems from the nonperipheral vertex points V5, V6, V7, V8, V9, V10, V11. It is easy to verify, that if there is a parallelogram defined by the images' colinearity table with two vertices colinear with a third vertex point, this parallelogram must connect the nonperipheral and the peripheral vertex points. This reduces the number of possible subgraph matches to 16. The additional property of the t-shaped object that a second parallelogram has one corner colinear with two other vertex points and thus must be a face defined by nonperipheral edges, further reduces the possible subgraph matches to a total of eight, etc. In general, as the discriminability of the objects' surfaces increases, the possibilities of subgraph matches decreases. The proposed method would consist of two phases: a computational expensive off-line model generation phase and a fast on-line recognition phase. The two phases comprise the following steps:

(I) Model Generation Phase
  (1) Use wire frame models and calculate conlinearity/ege slope tables.
  (2) Compute features of colinearity/edge slope tables for object and view dependent matching.
(II) Recognition Phase
  (1) Capture image of scene and digitize it.
  (2) Calculate gradient image and apply threshold to it.
  (3) Transform binary gradient image into Hough space.
  (4) Detect clusters in Hough space.
  (5) Extract properties of clusters in Hough space.
  (6) Perform subgraph matching which yields an object vertex to model vertex relation.
  (7) Perform geometric vertex point fitting.

In order to speed up the subgraph matching, colinearity and edge slope tables corresponding to different views of an object and simple features for them, like the total number of colinearities, the number of clusters with given slope, etc., may be precomputed and stored in an object model library in which several models belong to the same class of object. If necessary, remaining ambiguities may be resolved subsequently by geometric vertex fitting. The steps of this modified method are as follows:

(I) Model Generation Phase
  (1) Use wire frame models and calculate colinearity-/edge slope tables for different view directions.
  (2) Compute features of colinearity/edge slope tables to support matching.

(II) Recognition Phase
  (1) Capture image of scene and digitize it.
  (2) Calculate gradient image and apply threshold to it.
  (3) Transform binary gradient image into Hough space.
  (4) Detect clusters in Hough space.
  (5) Extract properties of clusters in Hough space.
  (6) Perform subgraph matching which yields an object vertex to model vertex relation.
  (7) Verify graph match by geometric vertex point fitting.

Implementation in a Robot System

Figure 10:
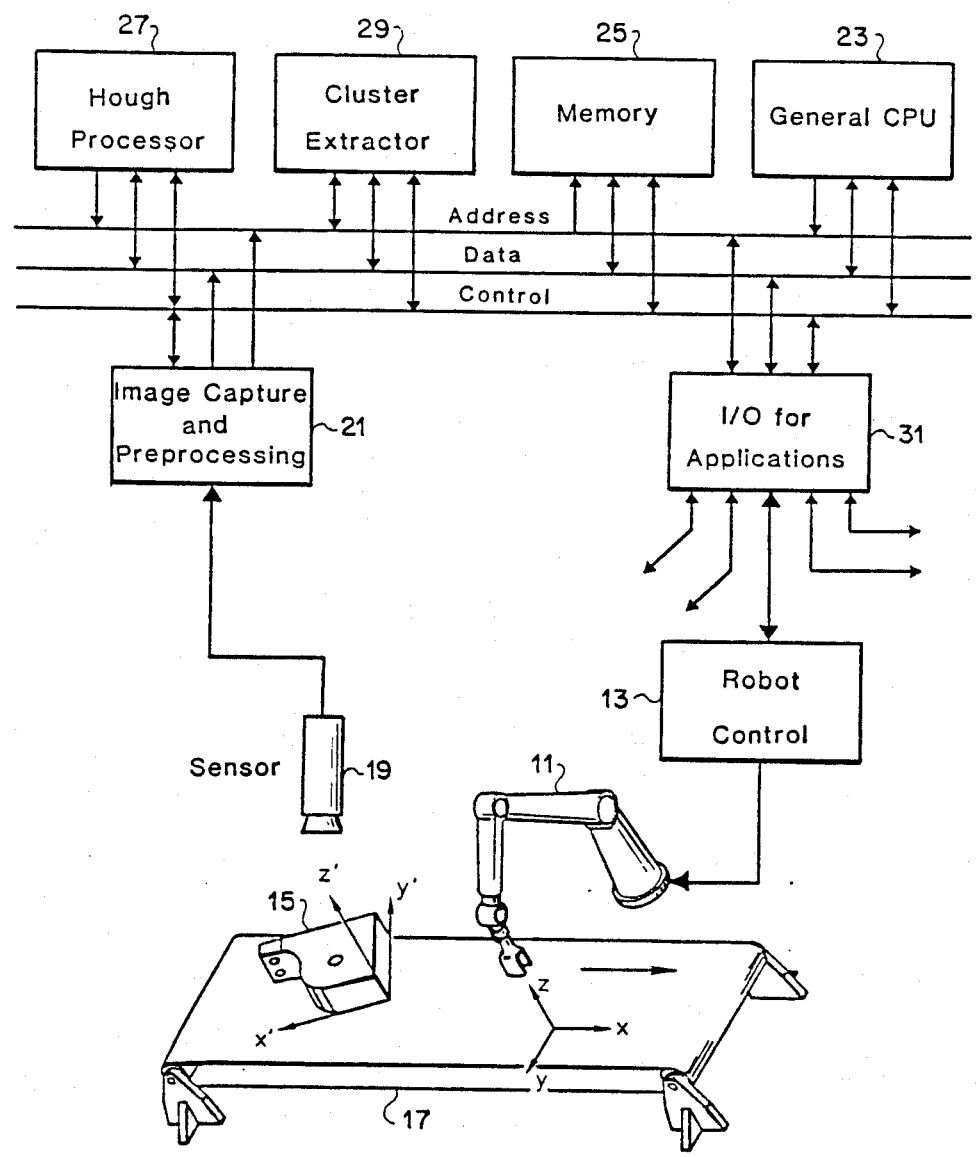
FIG. 10 is a block diagram of a robot control system implementing the invention.

In FIG. 10, a robot work cell with vision control is shown in which the invention is used. The system comprises a robot control arm 11 with robot control unit 13 for handling work pieces 15 which are placed on a conveyor belt 17. A sensor 19 such as a TV camera views a workpiece 15 and sends its output signals to an image capture and preprocessing unit 21. In this unit, the TV scan image such as the one shown in FIG. 3(a) is intermediately stored and in a preprocessing procedure a gradient image (as shown in FIG. 3(b)) is generated which essentially consists of lines representing edges of the workpiece. A central processing unit 23 is provided for controlling the evaluation operations and for performing the necessary arithmetic and logic operations. The gradient image is sent to memory 25 and to the Hough processor 27.

Hough processor 27 generates a Hough space representation of the workpiece from the gradient image it receives. The Hough space representation comprises intersecting lines forming clusters as shown in FIG. 3(c). Each cluster represents a straight line, i.e. an edge of the workpiece.

The Hough space representation is sent to cluster extractor 29 which extracts the coordinate values of the center point of each cluster so that a clear and precise cluster representation is available which also can be stored in memory 25. Several procedures can be used for cluster extraction; one possible simple cluster extraction method is briefly described in the following.

First, a horizontal projection vector is calculated by adding up the weighed intensity values of each column of the Hough space representation. If the intensity value of each point in the Hough space is designated as $H(i,j)$, the weightd value is then $[H(i,j)]^e$ with $e = 1.5 \ldots 4$ suitably selected. The horizontal projection vector thus comprises an accumulated intensity value for each column so that the columns or x-coordinates of clusters can be determined in a second step by finding the maxima in the horizontal projection vector. In a third step, a vertical projection vector is calculated for each of the maxima found in step two. This is done by adding up, for a small vertical strip of width $2\Delta$ around each maximum, the weighed intensity values $[H(i,j)]^e$ of each row. Thus, each vertical projection vector comprises an accumulated intensity value for a small row section of length $2\Delta$. The row or y-coordinate of each cluster in the respective strip can then be determined in a fourth step by finding the maxima in the vertical projection vectors. The coordinate values of points where horizontal and vertical maxima coincide are stored as cluster centers. Of course, the sequence can be reversed by starting with a vertical projection vector and then calculating a number of horizontal projection vectors.

The Hough space representation comprising only clusters represented by their center points (as shown in FIG. 3(d)) is stored in memory 25. For further processing, the necessary tables representing object models and the required programs for the respective application are stored in memory.

From the Hough space cluster table, specific configurations are determined as was explained in the previous description. Colinearities of clusters can be found by Hough processor 27 and cluster extractor 29 which transform each cluster point into a line, and the intersection of several lines (i.e. a cluster in the secondary Hough representation) indicates a colinearity in the original Hough space representation of object 15. Colinearities of clusters and their structures and configurations are listed in tables as explained above and compared to those of existing models that were entered into memory for the application. As was described above, the type of object and its orientation are determined by the inventive procedure and the respective data transferred to robot control 13 before workpiece 15 reaches the position below robot arm 11 so that the latter can be controlled to handle the workpiece correctly.

CONCLUSION

A new approach for 3-D object recognition has been proposed. The technique employs the noise insensitive Hough transform and thus the overall robustness of the technique with respect to imperfect image capture is good. As the Hough space clusters of an image deliver a representation with substantially decreased data volume the analysis and decomposition as well as the model matching can be performed fast enough with a low cost general purpose processor. Thus the method improves the efficiency e.g. of vision feedback for robot control, where strong realtime requirements are to be met.

TABLE 1

COLINEARITY TABLE (FOR FIG. 6)

| | | | | |
|---|---|---|---|---|
| S1 | C1 | C4 | C5 | 1 |
| S2 | C5 | C15 | C18 | 3 |
| S3 | C5 | C21 | C24 | 3 |
| S4 | C8 | C23 | C24 | 1 |
| S5 | C9 | C10 | C13 | 1 |
| S6 | C13 | C15 | C16 | 3 |
| S7 | C14 | C16 | C17 | 2 |
| S8 | C17 | C18 | C20 | 3 |
| S9 | C20 | C21 | C22 | 2 |

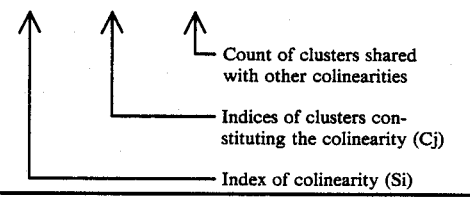

- Count of clusters shared with other colinearities
- Indices of clusters constituting the colinearity (Cj)
- Index of colinearity (Si)

TABLE 2

COLINEARITY CLUSTER COVERAGE TABLE

| Cluster index (Cj) (Edge number = Ej) | | | | | | | | |
|---|---|---|---|---|---|---|---|---|
| C1 C4 | C5 C8 | C9 C10 | C13 C14 | C15 C16 | C17 C18 | C20 C21 | C22 C23 | C24 |
| S1 | 1 1 | 1 | | | | | | |
| S2 | | 1 | | 1 | 1 | | | |
| S3 | | 1 | | | | 1 | | 1 |
| S4 | 1 | | | | | | 1 | 1 |
| S5 | | 1 | 1 | 1 | | | | |
| S6 | | | 1 | 1 | 1 | | | |
| S7 | | | 1 | 1 | 1 | | | |
| S8 | | | | | 1 | 1 | 1 | |
| S9 | | | | | | 1 | 1 | 1 |

↑— Index of colinearity (Si)

TABLE 3

REDUCED COLINEARITY CLUSTER COVERAGE TABLE

| Cluster index (Cj) (Edge number = Ej) | | | | | | | | |
|---|---|---|---|---|---|---|---|---|
| C1 C4 | C5 C8 | C9 C10 | C13 C14 | C15 C16 | C17 C18 | C20 C21 | C22 C23 | C24 |
| S2(a) 0 0 | 1 | 0 | | 1 0 | 0 1 | 0 | | |
| S2(b) | 1 | 0 | | 1 0 | 0 1 | 0 0 | | 0 |
| S3(a) | 1 0 | | 0 | | | 0 0 1 | 0 0 | 1 |
| S3(b) 0 0 | 1 0 | | | | | 0 1 0 0 | | 1 |
| S6 | 0 | 0 0 1 | 0 | 1 1 | 0 0 | | | |
| S8 | 0 | | | 0 0 0 | 1 1 | 1 0 | 0 | |

↑— Index of colinearity (Si)

TABLE 5

COLINEARITY TABLE (FOR FIG. 7)

| | | | |
|---|---|---|---|
| S1 | C1 | C4 | C5 |
| S2 | C1 | C2 | C20' |
| S3 | C3 | C2 | C7 |
| S4 | C3 | C4 | C8 |
| S5 | C5 | C9 | C12 |
| S6 | C5' | C15 | C18 |
| S7 | C5' | C21 | C24 |
| S8 | C7 | C22 | C23 |
| S9 | C8 | C23 | C24 |
| S10 | C9 | C10 | C13 |
| S11 | C10 | C11 | C14 |
| S12 | C11 | C12 | C20' |
| S13 | C13 | C15 | C16 |
| S14 | C14 | C16 | C17 |
| S15 | C17 | C18 | C20 |
| S16 | C20 | C21 | C22 |

↑↑— Indices of clusters constituting the colinearity (Cj)

— Index of colinearity (Si)

TABLE 6

EDGE SLOPE TABLE (FOR FIG. 7)

| | | | | | | | | |
|---|---|---|---|---|---|---|---|---|
| SLOPE 1 | E2 | E4 | E9 | E11 | E15 | E17 | E22 | E24 |
| SLOPE 2 | E1 | E3 | E10 | E12 | E16 | E18 | E21 | E23 |
| SLOPE 3 | E5 | E6 | E7 | E8 | E13 | E14 | E19 | E20 |

TABLE 7

EDGE SLOPE TABLE (FOR FIG. 6)

| | | | | | | | |
|---|---|---|---|---|---|---|---|
| SLOPE 1 | E4 | E9 | E15 | E17 | E22 | E24 | |
| SLOPE 2 | E1 | E10 | E16 | E18 | E21 | E23 | |
| SLOPE 3 | E5 | E6 | E8 | E13 | E14 | E19 | E20 |

Having thus described my invention what I claim as new and desire to secure by Letters Patent is:

1. A machine method for recognizing or identifying a three-dimensional object from a two-dimensional image of the object, using a Hough space representation of said image comprising clusters each represented by its center point, comprising the steps of:

TABLE 4

REDUCED COLINEARITY CLUSTER COVERAGE TABLES (EXPLICIT)

| | C1 | C4 | C5 | C8 | C9 | C10 | C13 | C14 | C15 | C16 | C17 | C18 | C20 | C21 | C22 | C23 | C24 |
|---|---|---|---|---|---|---|---|---|---|---|---|---|---|---|---|---|---|
| CASE A: S2(a)/S3(a) | | | | | | | | | | | | | | | | | |
| S2(a) | 0 | 0 | 1 | | | | 0 | | 1 | 0 | 0 | 1 | 0 | | | | |
| S3(a) | | 1 | 0 | | | | 0 | | | | | | 0 | 0 | 1 | 0 | 0 | 1 |
| S6 | | | 0 | 0 | 0 | 1 | 0 | 1 | 1 | 0 | 0 | | | | | | |
| S8 | | | 0 | | | | | 0 | 0 | 0 | 1 | 1 | 1 | 0 | 0 | | |
| CASE B: S2(b)/S3(a) | | | | | | | | | | | | | | | | | |
| S2(b) | | | 1 | | | | 0 | | 1 | 0 | 0 | 1 | 0 | 0 | | | 0 |
| S3(a) | | 1 | 0 | | | | 0 | | | | | | 0 | 0 | 1 | 0 | 0 | 1 |
| S6 | | | 0 | 0 | 0 | 1 | 0 | 1 | 1 | 0 | 0 | | | | | | |
| S8 | | | 0 | | | | | 0 | 0 | 0 | 1 | 1 | 1 | 0 | 0 | | |
| CASE C: S2(a)/S3(b) | | | | | | | | | | | | | | | | | |
| S2(a) | 0 | 0 | 1 | | | | 0 | | 1 | 0 | 0 | 1 | 0 | | | | |
| S3(b) | 0 | 0 | 1 | 0 | | | | | | | | | 0 | 1 | 0 | 0 | 1 |
| S6 | | | 0 | 0 | 0 | 1 | 0 | 1 | 1 | 0 | 0 | | | | | | |
| S8 | | | 0 | | | | | 0 | 0 | 0 | 1 | 1 | 1 | 0 | 0 | | |
| CASE D: S2(b)/S3(b) | | | | | | | | | | | | | | | | | |
| S2(b) | | | 1 | | | | 0 | | 1 | 0 | 0 | 1 | 0 | 0 | | | 0 |
| S3(b) | 0 | 0 | 1 | 0 | | | | | | | | | 0 | 1 | 0 | 0 | 1 |
| S6 | | | 0 | 0 | 0 | 1 | 0 | 1 | 1 | 0 | 0 | | | | | | |
| S8 | | | 0 | | | | | 0 | 0 | 0 | 1 | 1 | 1 | 0 | 0 | | |

(a) determining in the Hough space representation of said object image, cluster configurations having specific properties;

(b) providing predetermined cluster configurations of Hough space representations which correspond to known object models identifying vertex points in three-dimensional space;

(c) relating cluster configurations determined in step (a) to said predetermined cluster configurations of Hough space representations, in order to identify said object by comparison of the vertex points of said object image represented by cluster configurations determined in step (a) to corresponding vertex points of said object model representations; and (d) if further information is required for identification, fitting vertex points of the object image, the locations of which are given by the slope and intercept of respective cluster point colinearities in Hough space representation, to vertex points of at least one object model, on the basis of the relations determined in step (b).

2. Method according to claim 1, wherein said known object models comprise object primitive models representing basic geometrical objects, and for each such model a Hough space representation of its image as seen from a given view angle, with data characterizing existing specific cluster configurations of the respective model, is stored for comparison.

3. Method according to claim 1, wherein said known object models comprise wire frame models each representing the respective object modeled completely by providing geometric information about all its edges and vertices, and for each such wire frame model a Hough space representation with data characterizing existing specific cluster configurations is stored for comparison.

4. Method according to claim 3, wherein a Hough space representation with data characterizing specific cluster configurations is stored for each of a plurality of images of each such wire frame model as seen from different view angles, said images not comprising the edges and vertices which are hidden for the respective view angle.

5. Method according to claim 3, further comprising the steps of:

providing a graph representing the interrelation between edges and vertices of each wire frame model and information about the common slopes of edges;

providing a graph representing the interrelation of viewed edges and vertices, including common slopes, from the information about colinearities in the Hough space representation of an unknown object; and in a graph matching procedure, identifying those portions of the graph of each wire frame model which fit the graph of the unknown object.

6. Method according to claim 1, wherein said specific properties of cluster configurations include colinear arrangements of clusters, cluster colinearities intersecting each other exactly at a cluster, and parallel arrangements of cluster colinearities.

7. Method according to claim 1, wherein if more than one possible solution is found in step (c), one actual solution is selected by the vertex fitting procedure of step (d).

8. A machine method for recognizing a three-dimensional object from a two-dimensional image of the object, using a Hough space representation of said image comprising clusters each repesented by its center point, comprising the steps of:

(a) determining, in the Hough space representation of said object image, linear arrangements of cluster points, called cluster colinearities, each of said cluster colinearities representing a vertex in said object image;

(b) preparing tables of such cluster colinearities indicating their interrelations, including common cluster points;

(c) preparing tables representing specific cluster colinearity configurations identifying specific vertex point arrangements in said object image;

(d) preparing a Hough space representation for each of a plurality of preselected object models;

(e) determining cluster colinearities and preparing tables of cluster colinearities indicating their interrelations, for each of the preselected model Hough space representations, each of their cluster colinearities being related to a 3-D defined vertex point of the respective model; and (f) comparing the object colinearity tables prepared in step (c) to model colinearity tables prepared in step (e) for determining similar cluster colinearity configurations, thus relating vertex points of the object image to vertex points of at least one model.

9. Method according to claim 8, comprising the further steps of preparing additional edge slope tables for said object image as well as for the models, indicating common slopes of edges which are represented as cluster points in the Hough space representations of said object image and of each model, and additionally using in step (f) the indications of the edge slope tables for relating image vertex points to model vertex points.

10. A system for recognizing or identifying a three-dimensional object from a two-dimensional image of the object, using a Hough space representation of said image comprising clusters each represented by its center point, comprising:

(a) means for determining in the Hough space representation of said object image, cluster configurations having specific properties;

(b) means for storing predetermined cluster configurations of Hough space representations which correspond to known object models identifying vertex points in three-dimensional space;

(c) means for comparing said cluster configurations determined by said determining means to said predetermined cluster configurations of Hough space representations stored in said storage means, in order to identify said object by comparison of the vertex points of said object image represented by said determined cluster configurations to corresponding vertex points of said object model representations; and (d) means, responsive to said comparing means, for identifying said object and, if further information is required for identification, for fitting vertex points of the object image, the locations of which are given by the slope and intercept of respective cluster point colinearities in Hough space representation, to vertex points of at least one object model, on the basis of the relations determined by said comparing means.

11. System according to claim 10, wherein said known object models comprise object primitive models representing basic geometrical objects, and for each such model a Hough space representation of its image as seen from a given view angle, with data characterizing existing specific cluster configurations of the respective model, is stored in said storage means for comparison.

12. System according to claim 10, wherein said known object models comprise wire frame models each representing the respective object modeled completely by providing geometric information about all its edges and vertices, and for each such wire frame model a Hough space representation with data characterizing existing specific cluster configurations is stored in said storage means for comparison.

13. System according to claim 12, wherein a Hough space representation with data characterizing specific cluster configurations is stored in said storage means for each of a plurality of images of each such wire frame model as seen from different view angles, said images not comprising the edges and vertices which are hidden for the respective view angle.

14. System according to claim 12, further comprising:
means for providing a graph of the interrelation between edges and vertices of each wire frame model and information about the common slopes of edges;
means for providing a graph representing the interrelation of viewed edges and vertices, including common slopes, from the information about colinearities in the Hough space representation of an unknown object; and
graph matching means for identifying those portions of the graph of each wire frame model which fit the graph of the unknown object.

15. System according to claim 10, wherein said specific properties of cluster configurations include colinear arrangements of clusters, cluster colinearities intersecting each other exactly at a cluster, and parallel arrangements of cluster colinearities.

16. System according to claim 10, wherein said identifying means comprises means, if more than one possible model is found by said comparing means, for selecting one actual model according to said vertex fitting procedure.

17. A system for recognizing a three-dimensional object from a two-dimensional image of the object, using a Hough space representation of said image comprising clusters each represented by its center point, comprising:
(a) means for determining, in the Hough space representation of said object image, linear arrangements of cluster points, called cluster colinearities, each of said cluster colinearities representing a vertex in said object image;
(b) first means for preparing tables of such clusters colinearities indicating their interrelations, including common cluster points;
(c) second means for preparing tables representing specific cluster colinearity configurations identifying specific vertex point arrangements in said object image;
(d) means for preparing a Hough space representation for each of a plurality of preselected object models;
(e) third means for determining cluster colinearities and preparing tables of cluster colinearities indicating their interrelations, for each of the preselected model Hough space representations, each of their cluster colinearities being related to a 3-D defined vertex point of the respective model; and
(f) means for comparing the object colinearity tables prepared by said second means to model colinearity tables prepared by said third means for determining similar cluster colinearity configurations, thus relating vertex points of the object image to vertex points of at least one model.

18. System according to claim 17, further comprising means for preparing additional edge slope tables for said object image as well as for the models, indicating common slopes of edges which are represented as cluster points in the Hough space representations of said object image and of each model, and means for providing the indications of said additional edge slope tables to said comparing means for additional use in relating image vertex points to model vertex points.

* * * * *